United States Patent [19]

Mejia

[11] 4,347,294
[45] Aug. 31, 1982

[54] NOVEL ELECTRIC STORAGE BATTERY ASSEMBLY

[76] Inventor: Santiago Mejia, Cerrera 30 No. 12-99, Bogota, Colombia

[21] Appl. No.: 234,509

[22] Filed: Feb. 12, 1981

[51] Int. Cl.³ ............................................. H01M 6/42
[52] U.S. Cl. .................................. 429/151; 429/159; 429/160; 429/178
[58] Field of Search ............... 429/151, 159, 158, 160, 429/175, 176, 178, 186

[56] References Cited

U.S. PATENT DOCUMENTS

| | | | |
|---|---|---|---|
| 1,651,753 | 12/1927 | Dayes | 429/156 X |
| 1,935,790 | 11/1933 | Dame | 429/156 X |
| 2,692,906 | 10/1954 | Morgan | 429/151 |
| 2,768,230 | 10/1956 | Roberts | 429/156 |
| 3,112,003 | 11/1963 | Niederer | 429/163 X |
| 3,147,151 | 9/1964 | Toce | 429/163 X |
| 3,463,672 | 8/1969 | Schmidt | 429/151 X |
| 4,100,333 | 7/1978 | Haas et al. | 429/176 X |

*Primary Examiner*—Charles F. Lefevour
*Attorney, Agent, or Firm*—Browdy and Neimark

[57] ABSTRACT

An electric storage battery assembly is formed of easily removable individual cell casing units. Each of the cell units is provided on alternate corner edges with vertical dovetail projecting ribs and dovetail grooves. The dovetail ribs and grooves provided on the edges of adjacent cell casings matingly and removably interengage. Conductor straps are provided to removably mechanically and electrically interconnect the electrode terminal posts of adjacent cell units in series arrangement. Longitudinal U-shaped channeled covers may be provided to slidably interlock with the conductor straps connecting adjacent cell casings. A cell casing lid provided with suitable openings and electrolyte-filling bosses is provided to cover and close the open top end of the cell casing. The lid may be provided on one side with a horizontal locking sleeve which removably interengages with a slidable transverse lug provided with a correspondingly shaped dovetail recess which matingly receives the dovetail shaped locking sleeve formed on the lid. This construction permits ready removal and replacement of defective cell units as well as flexibility in providing desired dimension configuration and electric output rating in the composite battery assembly by manufacturers, jobbers or distributors.

5 Claims, 2 Drawing Figures

NOVEL ELECTRIC STORAGE BATTERY ASSEMBLY

FIELD OF INVENTION

The present invention relates to electric storage batterie and more particularly concerns composite battery assemblies made up of multiple separate removably interlocked battery casings.

BACKGROUND OF INVENTION

As conducive to a more ready understanding of the invention herein it may be noted that over a long period of years the cost of producing and marketing electric storage batteries has undergone substantial reduction. Particularly, this is true with the batteries intended and adapted for vehicle use. Moreover, importantly increased life expectancy has been imparted thereto. Notwithstanding all of this, however, it is well known that in such batteries a cell failure is frequently unexpectedly and unpredictably encountered. Also it is well known that when such failure is experienced, the economic complexities are such that repair is not feasible, as by replacing a cell. On the contrary, it is often necessary to replace the entire battery assembly. This is so, even though the remaining cells may fully retain normal operating characteristics and individually have full life expectancy.

In this connection, it should be noted that a composite battery of known, accepted and conventional type is made up of a number of electrically interconnected individual cell units. In the early days of the electric storage battery, particularly for automotive use, both the high first cost and replacement cost of these batteries made it feasible, upon failure of one component cell, to open the battery in its entirety and replace the plates and/or electrolyte of the defective cell, or to repair the walls of separators thereof, as may be required. This procedure, however, has not been practical in the present-day composite battery. The art has long sought a ready, practical and inexpensive way of removing a single defective cell unit and replacing it with a new unit without disturbing the related cell units and without disturbing the composite battery.

Another problem perplexing the industry is the comparative inflexibility of the known batteries. Heretofore, it has been necessary for a dealer in batteries to stock some 8 or 10 different sizes and shapes of batteries. These batteries are usually of either six- or twelve-volt construction, comprised of three of six cells respectively in differing cell arrangement (side-by-side, end-to-end, or combinations thereof) and differing output capacities. In each such instance, regardless of the number of component cells or the electrical rating of the resulting composite battery, all of these cells in successful commercialized batteries are inflexibly integrated together from the outset, during manufacture, in permanent relationship. This imposes on the dealer a problem of stocking a large number of batteries with resultant large inventory and slow turnover. Moreover, it has been necessary to produce and stockpile batteries of all conventional types, thus appreciably increasing investment in capital operating costs and the storage facilities required.

It is known in the patent literature to removably interlock a plurality of storage battery casings by means of interengaged dovetailing ribs and recesses or grooves for the purposes of associating casings in various desired combinations to obtain desired dimensions, shapes, voltages and output ratings. Such is shown in the U.S. Pat. No. 3,147,151 to Toce. Other patents showing association of cells are the U.S. Pat. No. 4,100,333 to Haas et al; Dayes U.S. Pat. No. 1,651,753; Dame, U.S. Pat. No. 1,935,790; Roberts, U.S. Pat. No. 2,768,230 and Niederer, U.S. Pat. No. 3,112,003. These constructions have not, however, been successful.

SUMMARY OF INVENTION

The invention herein constitutes an improvement over the prior art constructions shown in Toce by providing superior dovetail interlocking means. Specifically, the invention herein is directed to a composite battery casing which includes horizontal locking sleeves provided with a dovetail recess for receiving transverse lugs and slidably interlocked longitudinal channeled covers lockingly engaged with series cell casing connecting conductor straps. This construction provides a more secure and effective mechanical and electrical assembly than that taught in the above acknowledged prior art.

An important object of this invention, accordingly, is directed to providing a successful battery having separate and removably interlocked electric storage battery cell units.

It is a further object to provide a composite battery made up of such cell units interlocked together, wherein the interlocking elements are readily applied to the battery casing, resulting in firm and positive interlocks, while permitting ready removal of individual cells as and when required, and facilitating the build-up, in custom jobbing, of composite storage batteries in desired physical configuration and dimension, and output rating, both as to voltage and current.

Another object of the invention herein is to provide an electric storage battery assembly which is simple, compact, of long useful life and practically foolproof in operation.

A further object is to provide an electric storage battery casing which can be readily and flexibly interlocked with companion complemental casings in any desired combination, thus providing a composite storage battery of desired overall dimension, shape, voltage and output rating.

A still further object is to provide a composite electric storage battery formed up of removably interlocked individual cell casings, which composite battery may have any desired configuration, voltage and output rating and which battery provides important economies in subsequent operation in that defective cell casings can be readily removed and replaced without loss or damage to the related and still operable cell casings of the battery.

All of the foregoing, as well as many other highly practicable objects and advantages, attend the practice of the invention herein, which will in part be apparent and in part more fully pointed out hereafter, during the course of the following description, reference being particularly had to the several sheets of drawing forming part of this application.

In the several views of the drawings, wherein several embodiments of the above constructions are disclosed:

DETAILED DESCRIPTION OF EMBODIMENTS

Figure 1:
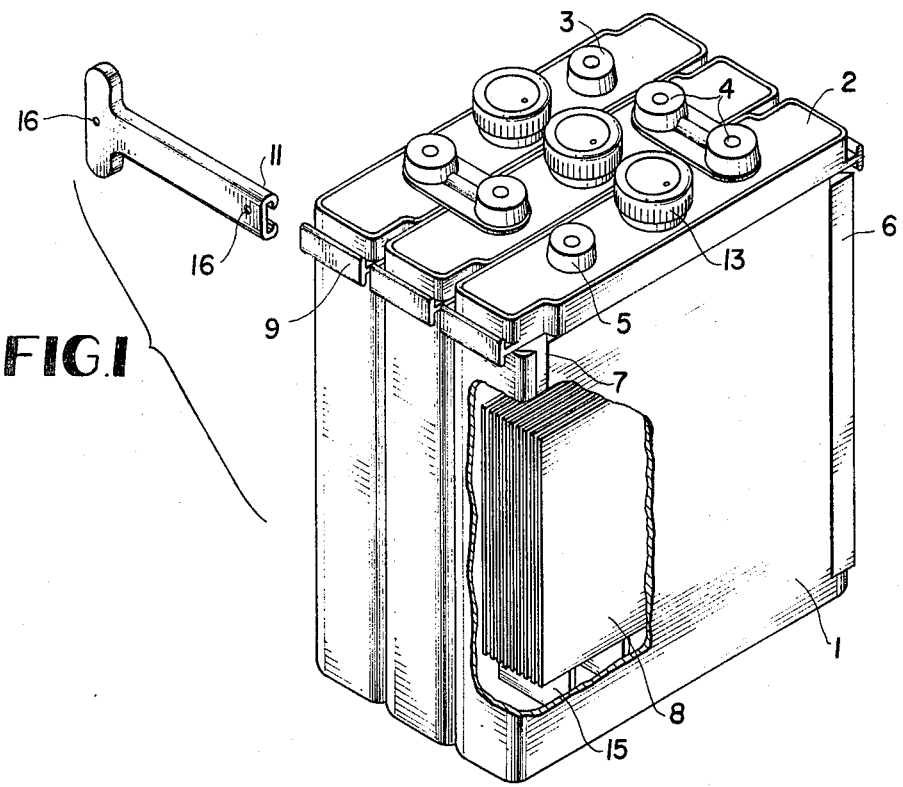
FIG. 1 illustrates in an exploded and partly broken away perspective view a first embodiment wherein three individual storage battery cell casings are interlocked by vertical corner dovetailung ribs and grooves formed on the respective edges of the casings and wherein a horizontal locking sleeve receives dovetail transverse lugs formed on the top edge portion of the cell casings.
Figure 2:
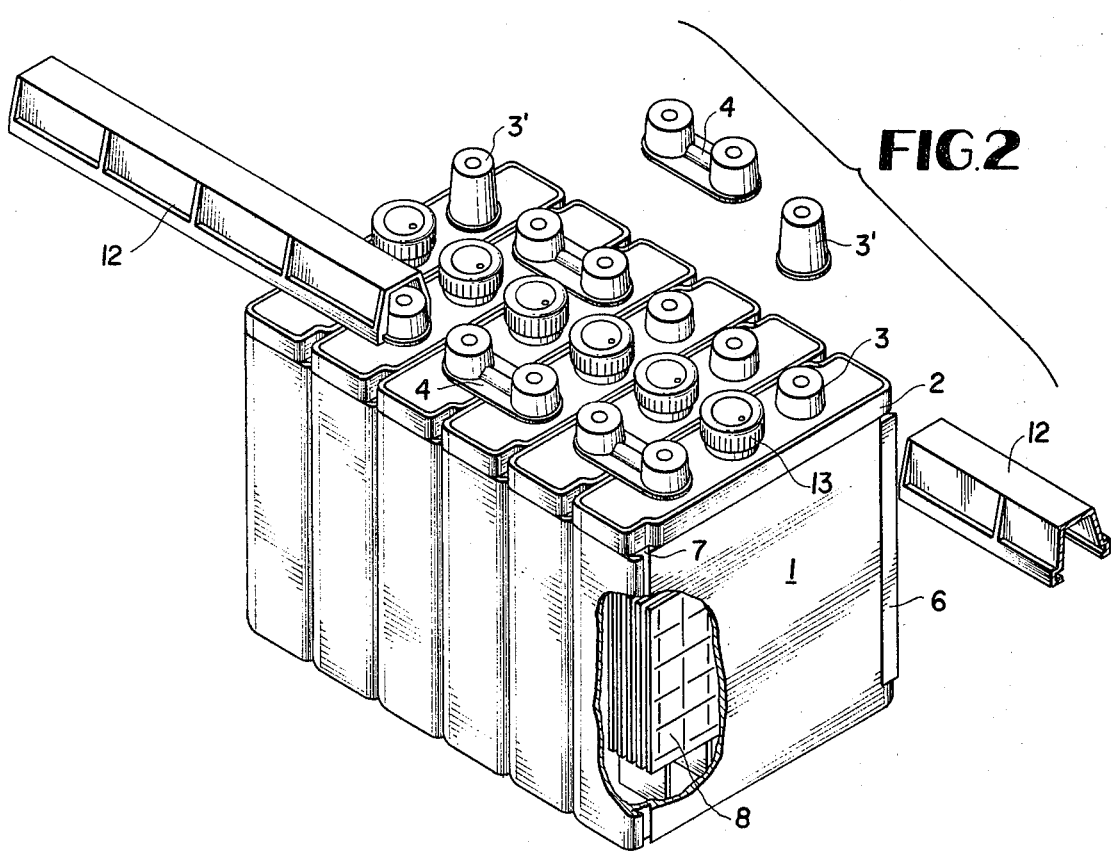
FIG. 2 similarly illustrates in an exploded and partly broken away perspective view of a second embodiment wherein six individual storage battery cells are interlocked by vertical corner dovetail receiving ribs and grooves and further including slidably interlocked longitudinal channeled covers lockingly engaged with the series cell casing connecting conductor straps.

Now having reference to the practice of the above-described invention herein, attention is more particularly directed to FIGS. 1 and 2 of the accompanying drawings. FIG. 1 shows a first embodiment comprising three cells, wherein each individual cell casing 1 depicted is generally rectangular in transverse cross-section and may be formed of molded plastic or other suitable material. Each cell casing 1 is open at its top end and is covered by a lid 2 which serves to close the cell at its open end. Provided in the lid 2 are corresponding openings to receive terminal posts 3 and 5 of the cell and a hollow boss covered by a filler cap 13 between the openings 3 and 5, which hollow boss comprises an entrance port for the electrolyte liquid for the battery. Conventional screw threading is provided for removable engagement of the filler cap 13 with its corresponding boss. Each lid 2 may be formed by molding, or other suitable process from plastic or generally similar material. Similarly, the filler caps 13 may be formed of suitable and readily available materials of which plastic is typical.

A section of the cell casing wall 1 is cut away in FIG. 1 to expose battery plate 8 which are located within the cell as well as internal reinforcement 15. After the battery plates 8 are located within an individual cell 1, the lid 2 is positioned over the open top of cell casing 1 and is sealed to the casing in any desired manner. The filler cap 13 is then unscrewed and the cell casing is filled with a conventional electrolyte. As best seen in FIG. 1, several separate means for removable interlocking engagement between related and adjacent cell casings is provided by utilizing suitable engaging and locking constructions and elements.

More specifically, each cell casing 1 is provided at alternate corners with vertical dovetail ribs 6 and vertical dovetail grooves 7. The vertical groove 7 of a cell casing 1 matingly receives, in removable dovetailing engagement, the corresponding vertical rib of the adjacent cell casing. The respective dovetail ribs and grooves are formed on each corner of the individual cell casing in any suitable manner, such as by molding or otherwise.

Similarly by molding, or any other suitable process, horizontal projecting locking T-ribs 9 are integrally provided at one of the side edges of each individual lid 2, located at the top edge portion of the cell casing 1. A transverse lug 10, provided with a suitably complementary groove or sleeve 11, slidingly and removably matingly interlocks with the T-rib 9. Holes 16 are provided in the lug 10 through which fastening means may be inserted to fit the lug 10 in place relative to the T-ribs 9.

Protruding electrode terminal posts 3,3 or 5,5 of adjacent cell casings each receive a removable conductor strap 4 which serves to mechanically and electrically connect adjacent cell casings in series arrangement.

FIG. 2 shows a similarly constructed second embodiment comprising six adjacent cells mechanically interlockingly and removably secured together by corresponding mating vertical corner dovetail projecting ribs and dovetail grooves. A conductor strap 4 is shown in raised elevation and serves to mechanically and removably connect electrode terminal posts 3,3 of adjacent cell casings in a series electrical arrangement. Special elongated terminal posts 3' are provided to fit over the posts 3 at the corners of the battery to provide for connection to the battery cables. A longitudinal U-shaped channel cover 12 is seen at the top portion of the composite battery assembly and functions to slidably and removably interlock the series cell connecting conductor straps 4.

It is within the scope of this invention to interlock six cell casings having the construction shown in FIG. 1 and to provide slidably engaged channeled covers 12 for such construction in the manner depicted in FIG. 2. Alternately, it is within the scope of this invention to modify the shape of the side edges of lids 2 of the FIG. 2 embodiment to include integrally formed locking sleeves 9 for mating engagement with a transverse lug 10 in the manner clearly depicted in the construction shown in FIG. 1.

It is apparent from the foregoing that the invention herein provides substantial flexibility in electric storage battery construction. The individual cells, employing the novel casing of the invention herein are readily and simply formed in themselves. The casings are of simple configuration and low in cost of production. They are fashioned through the use of production techniques, such as molding and laminating, which similarly are themselves simple and economical. It is likewise apparent that it involves a time interval of but a few moments to assemble a composite battery from the cell units which have been described above. Dovetailing may be provided, as desired, on one, two or more sides or faces of the cell casing. Through the use of the new constructions described herein the battery assembly, formed of such individual cell units, is subject to ready replacement of a defective cell. It is equally subject to placing cells in any desired configuration.

The dovetailing interlock constructions, which have been described above may be applied directly by mechanical securement or by adhesive bonding to the appropriate casing portions, or may be formed integrally therewith, as by molding.

An important advantage of this invention is that the manufacturer need tool up for the production of only a single cell casing together with the limited components of the cell unit which are required. Using the conventional dry-charge construction now popularly accepted, the manufacturer can stockpile the electrolyte-free cell in substantial quantities. From this stockpile he can, as and when required, supply his jobbers and distributors with composite batteries of desired size, shape and output rating, all at minimum cost. Alternatively, he can supply the jobbers and distributors with cells for their assembly into storage batteries of desired specification.

Similarly, the jobber and distributor is required to only stockpile one type of cell. Three, six or other numbers of these cells are assembled into a composite battery of desired configuration and electrical rating. The same cell units may be employed for ready replacement purposes, as and when required.

All the foregoing, as well as many other highly important and practical advantages attend the practice of this invention.

It is apparent from the foregoing that once the broad aspects of the invention are disclosed, many embodiments thereof will readily occur to those skilled in the art, as well as many modifications of the embodiments here disclosed. Accordingly, it is intended that the foregoing disclosure be considered as purely illustrative, and not as limitative.

What is claimed is:

1. A composite electric storage battery assembly comprising a plurality of removably interlocked individual cell casing units, each of said units being provided on alternate corner edges with vertical dovetail projecting ribs and dovetail grooves, the dovetail ribs and grooves of adjacent cell units matingly and removably interengaging with one another, a plurality of removable conductor straps mechanically and electrically interconnecting the electrode terminal posts of adjacent cell units in a series arrangement, each of said cell units being covered and closed by a lid provided with openings to receive the terminal posts of the cell unit and a screw threaded hollow boss to permit the filling of the cell with an electrolyte fluid, said boss being closed off by a correspondingly threaded mating filler cap, each of said lids having a horizontal rib which removably and matingly engages with a corresponding shaped recess formed in a horizontally slidable transverse lug.

2. A composite electric storage battery, as claimed in claim 1, further comprising a U-shaped channel cover to slidably removably engage and interlock with the connecting conductor straps for the electrode terminal posts located on one side of the adjacent cell units.

3. A composite electric storage battery, as claimed in claim 2, wherein U-shaped channel covers are provided to interlock with the connecting conductor straps on both sides of the adjacent cell units.

4. A composite electric storage battery assembly comprising a plurality of removably interlocked individual cell casing units, each of said units being provided on alternate corner edges with vertical dovetail projecting ribs and dovetail grooves, the dovetail ribs and grooves of adjacent cell units matingly and removably interengaging with one another, a plurality of removable conductor straps mechanically and electrically interconnecting the electrode terminal posts of adjacent cell units in a series arrangement, each of said cell units being covered and closed by a lid provided with openings to receive the terminal posts of the cell unit and a screw threaded hollow boss to permit the filling of the cell with an electrolyte fluid, said boss being closed off by a correspondingly threaded mating filler cap, a U-shaped channel cover to slidably removably engage and interlock with said conductor straps for the electrode terminal posts located on one side of the adjacent cell units.

5. A composite electric storage battery, as claimed in claim 4, wherein a second U-shaped channel cover is provided so that said covers interlock with the conductor straps on both sides of the adjacent cell units.

* * * * *